United States Patent

[11] 3,624,650

[72] Inventors T. O. Paine
Administrator of the National Aeronautics and Space Administration with respect to an invention of;
Richard L. Horttor, Pasadena; Richard M. Goldstein, La Canada, Calif.
[21] Appl. No. 856,279
[22] Filed Sept. 9, 1969
[45] Patented Nov. 30, 1971

[54] METHOD AND APPARATUS FOR MAPPING PLANETS
14 Claims, 5 Drawing Figs.
[52] U.S. Cl. .................................................. 343/6.5 R, 343/5 CM, 343/100 ST
[51] Int. Cl. .................................................. G01s 9/02, B64g 9/00
[50] Field of Search ........................................... 343/5 CM, 6.5 R, 100 ST

[56] References Cited
UNITED STATES PATENTS
3,191,170  6/1965  Lustig et al. .................. 343/5 CM
Primary Examiner—T. H. Tubbesing
Attorneys—J. H. Warden, Monte F. Mott and G. T. McCoy ABSTRACT: A radar system is disclosed for obtaining data to map planets employing and S-band ranging transponder (RT) that is widely separated from and in motion relative to a stationary transmitter-receiver station (STRS) on earth. The STRS transmits a ranging signal which is biphase modulated by a pseudonoise (PN) code, and the RT retransmits the PN-modulated signal on a different carrier frequency. The STRS receives the retransmitted signal as a reflected signal from an area of the planet (AP) being mapped. Three time-varying delay times (STRS to RT, RT to AP and AP to STRS) are involved in the round trip communication delay. That round trip delay and a doppler shift of the reflected signal are tracked by the STRS for mapping. That is done by recording the received signal in phase quadrature at baseband. The technique for obtaining mapping data then consists of multiplying the recorded signal by a locally generated PN code after synchronizing the PN code modulation of the signal to the local PN code, and separating the synchronized PN-code-modulated signal from the rest of the received signal by a low-pass filter. The separated PN-code-modulated signal corresponds to a narrow strip or contour line at constant range from the RT which is substantially orthogonal to virtually parallel contours of doppler shift caused by motion of the RT relative to the AP. A filter which matches the doppler shift can thus be employed to resolve individual mapping points for display.

EARTHBOUND
STATION

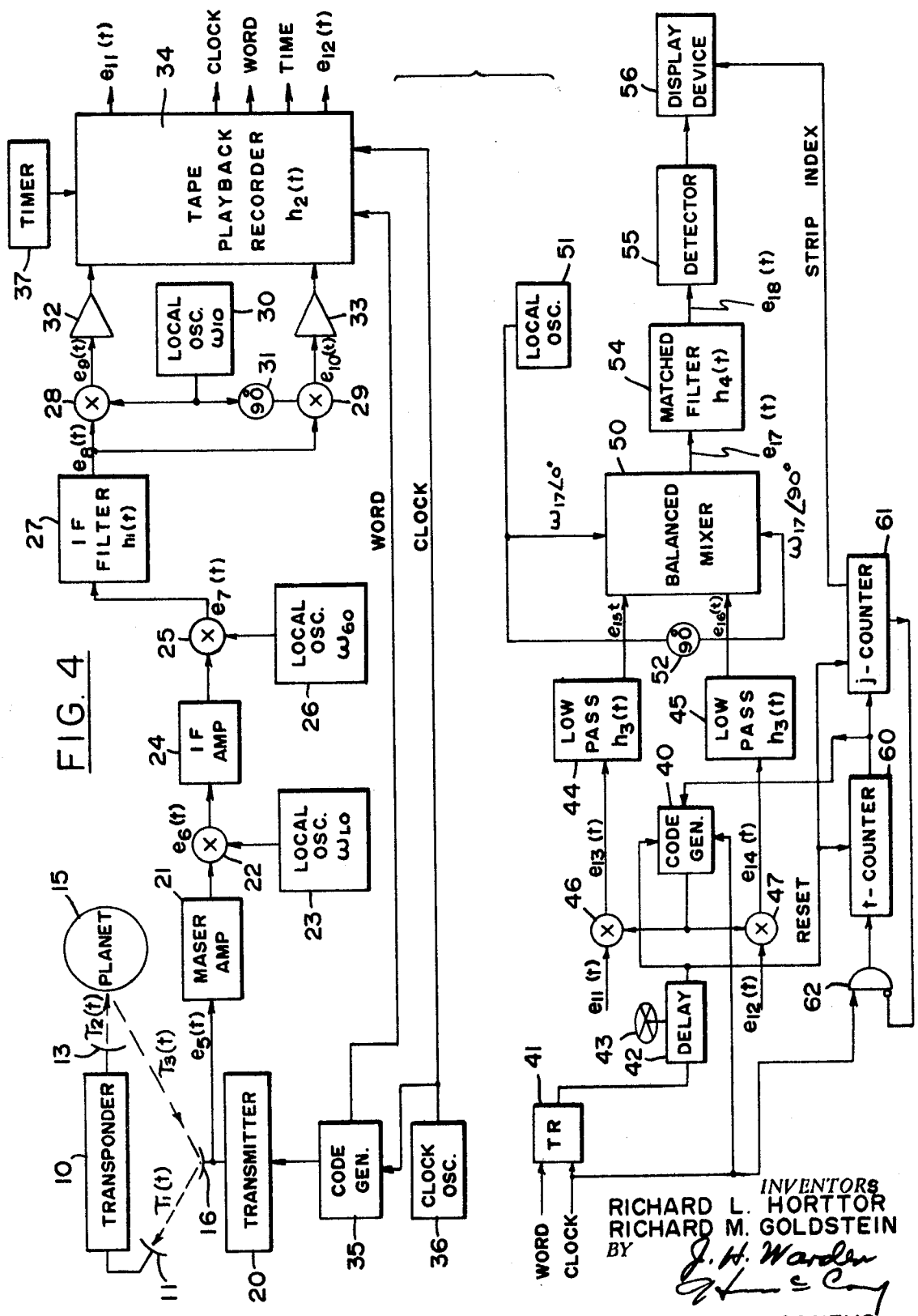

3,624,650

METHOD AND APPARATUS FOR MAPPING PLANETS

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to a method and apparatus for mapping planets.

Areas of the earth's surface have been mapped with side-looking radar consisting of a transmitter and receiver in the same aircraft. The doppler history of an elemental area illuminated as the aircraft flies by can be recreated from independent amplitude and phase measurements of received signals. In a typical side-looking radar system, the transmitter illuminates the area periodically with pulses of electromagnetic energy, and reflections are observed by a receiver having a bandwidth sufficient to allow independent amplitude and phase measurements to be made. The output of the receiver is then synchronously detected. In-phase and quadrature outputs from the detector are stored for each cycle of illumination in such a manner as to permit them to be read out in azimuth and processed by a matched filter to give fine azimuth resolution essential to a final high-resolution map. However, side-looking radar systems which have been known or proposed are not now practical for mapping planetary surfaces because of the mass and complexity of the equipment required to be flown over the planetary area to be mapped.

Present earthbound techniques for mapping planetary surfaces employ electromagnetic waves transmitted with a time code to allow reflected waves to be detected for resolution of constant time delay contours in the form of circles concentric to the point nearest earth. Rotation of the planet about its axis produces constant doppler contours parallel to that axis. The mapping information then consists of signal time delay and doppler shift. However, such doppler and time-delay contours intersect at two points since each constant time-delay contour is a circle. The only exception is the doppler contour tangent to a time-delay contour. Thus, a given set of doppler and time-delay contour data will normally correspond to two planetary surface points. The ambiguity can be resolved only by comparing data from more than one observation time.

Others have obtained limited mapping data using a spacecraft orbiting about a planet as a transmitter. However, an unmodulated continuous (CW) signal was used so that only doppler contour data were obtained from the reflected signal received at an earthbound station. It would be desirable to resolve the reflected signal in two substantially orthogonal dimensions for unambiguous mapping of planetary surface points.

SUMMARY OF THE INVENTION

According to the invention, a radar signal is transmitted from an earthbound station to a transponder in a spacecraft, routed through the transponder, and retransmitted on a different carrier frequency. The retransmitted signal is reflected by the planet being mapped to the earthbound station. For range resolution, the transmitted and retransmitted radar signal is modulated by a code word.

The signal received by the earthbound station is stored for later analysis. That analysis consists of range gating the recorded signal. Real time is synchronously recorded with the signal received for proper tracking of the round trip delay, i.e. for establishing the trip delay or slant range contours of particular mapping points. Resolution of the doppler contours is accomplished by a filter which matches the motion-induced phase shift on the signal received and recorded.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 4 illustrates a block diagram of a preferred embodiment of the general system of FIG. 1.

Figure 1:
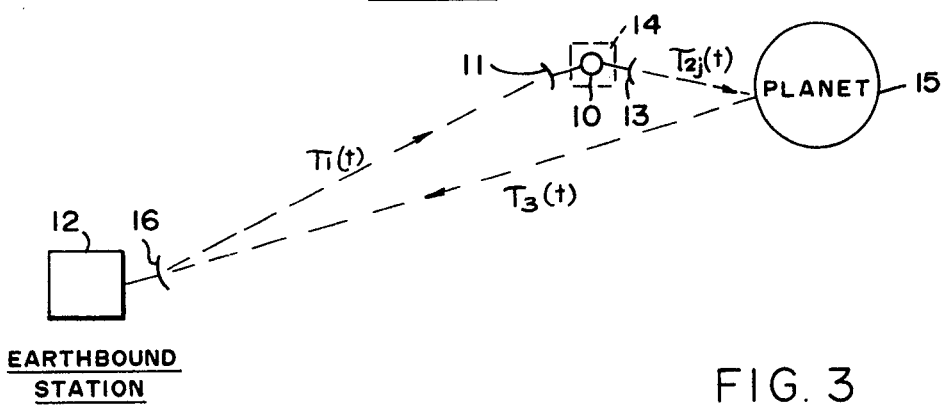
FIG. 1 illustrates a general diagram of a radar mapping system according to the present invention.

Referring to the drawings, a surface-mapping system is disclosed employing an S-band ranging transponder 10 with high-gain antenna 11 for receiving signals from an earthbound station 12. The signal received is routed through the transponder 10, and retransmitted through an antenna 13 on a different carrier frequency. The transponder 10 is carried by a spacecraft indicated by a dotted line box 14.

The signal transmitted by the transponder 10 is reflected from the surface of a planetary body 15 and received at the station 12. It should be understood that by using separate carrier frequencies a single antenna 16 may be employed for simultaneously transmitting and receiving radar signals.

This system involves three communication links each with a time-varying delay $\tau$. Thus, in order to keep time and frequency references, the ranging modulation is first transmitted from the station 12 and then retransmitted by the transponder 10. Proper tracking of the round trip delay and doppler shift of the signal received by the station 12 provides the mapping data.

Ranging resolution of point scatterers on the planetary surface is achieved by using a pseudonoise (PN) code biphase-modulated on a carrier at the station 12. The retransmitted signal has the same PN code. Accordingly, when the reflected signal is received by the station 12, it may be identified and synchronized with a locally generated code. The portion of the received signal having a PN code modulation synchronized with the local PN code can be separated from the rest by a low-pass filter. The result is data pertaining to a narrow strip 17 at a constant slant range R from the transponder 10 shown in FIG. 2.

Each point within the strip 17 passes through lines of constant doppler $\Phi^j(t)$ caused by motion of the transponder 10 in the direction indicated. Those doppler lines are substantially normal to constant range lines $\tau^j(t)$. Thus a filter which matches that motion-induced phase behavior of the signal received by the station 12 can resolve individual point scatters and spatial coordinates which are represented by time delay $\tau^j(t\Phi^j(t))$.

The surface resolution is determined by the radar beam incidence angle $\psi$, the PN code bit time, and the bandwidths of the transponder 10, the receiver of the station 12 and the data-recording system. The bit rate for the modulating PN code may be, for example, a ⅓ MHz. clock, allowing a 3$\mu$ sec bit time. The PN code length is preferably just long enough (1,023 bits) to keep the reflected signal and the signal received by the station 12 directly from the transponder 10 unambiguous, because although a longer code would provide better suppression of the direct signal, searching for the surface-reflected signal would become more difficult.

The present invention will now be described in greater detail with reference to a block diagram in FIG. 4 for a preferred embodiment of the earthbound station. The signal flow from the earthbound station to the transponder 10, to the surface of the planet 15, and back to the earthbound station involves three time delays $\tau_1(t)$, $\tau_2(t)$ and $\tau_3(t)$. The earthbound station tracks these delays and performs operations which culminate in a system response to point reflectors on the planetary surface in order that a map may be produced as a superposition of many responses from the planetary surface features.

The signal transmitted from the antenna 16 at a given frequency $\omega_1$ is phase modulated by a transmitter 20 with a PN code. One length of the code is denoted by $x(t)$ and is T seconds long. The modulating signal is then $$X(t) = \sum_{n=-\infty}^{\infty} x(t-nT), \quad x(t) = \pm 1 \qquad (1)$$

for $x(t) = \pm 1$.

Assuming a modulation index $\beta$, the transmitted signal is $S_1(t) = A_1 2 \cos(\omega_1 t + \beta X(t))$ (2)

The signal $S_2(t)$ received by the transponder 10 is then the transmitted signal delayed by the time $\tau_1(t)$.

The transponder 10 retransmits the delayed signal on a different carrier frequency $\omega_3$. The retransmitted signal $S_3(t)$ is received at the surface of the planet 15 after the additional delay $\tau_{2j}(t)$. The signal $S_4(t)$ received at the planet surface also has a time-varying amplitude factor caused by motion of the planet through the illuminating beam of the antenna 13.

The reflected signal $S_5(t)$ received by the antenna 16 at the earthbound station has the additional time delay $\tau_3(t)$, an attenuated power factor $A_5$ and a white Gaussian planetary background noise $n_1(t)$ and $n_2(t)$. Therefore, the signal $S_5(t)$ is given by the following equation.

$$S_5(t) = A_5(t-\tau_a(t))\sqrt{2}\cos[\omega_3(t-\tau_\phi{}'t)) + \beta X(t-\tau(t)) + \theta_1] + n_1(t)\cos(\omega_3 t + \theta_2) + n_2(t)\sin(\omega_3 t + \theta_2) \qquad (3)$$

The antenna 16 also receives an interference signal $S_{5I}(t)$ directly from the antenna 13 with a time delay equal to $\tau_1(t)$. Accordingly, a maser amplifier 21 translates both signals $S_5(t)$ and $S_{5I}$ to a mixer 22 where they are mixed with a frequency $\omega_{LO}$ from a local oscillator 23 to provide at an input terminal of an IF amplifier 24 a signal $e_6(t)$. The frequency difference ($\omega_3 - \omega_{LO}$) is 50 MHz.

A second mixer 25 receives that signal $e_6(t)$ and a 60 MHz. reference signal from a local oscillator 26 to produce a signal on a 10 MHz. IF carrier as follows.

$$e_6(t) = (S_5(t) + S_{5I}(t) + n_5(t))\sqrt{2}\cos\omega_{LO}t \qquad (4)$$
$$e_7(t) = e_6(t) 2\cos\omega_{60}t \qquad (5)$$

After mixing, the signal $e_7(t)$ is passed through a 10 MHz. IF filter 27 having a 3.3 bandwidth in order to record the signal $e_8(t)$ at baseband on magnetic tape.

The following quadrature components are developed for storage.

$$e_9(t) = e_8(t) 2 \sin\omega_{10}t \qquad (6)$$
$$e_{10}(t) = e_8(t) 2 \cos\omega_{10}t \qquad (7)$$

That is accomplished by mixer 28 which receives a reference frequency of 10 MHz. from a local oscillator 30 directly for the in-phase signal $e_9(t)$ and a mixer 29 which receives the reference frequency $\omega_{10}$ through a 90° phase shifter 31 for the quadrature signal $e_{10}(t)$.

The component signals $e_9(t)$ and $e_{10}(t)$ are recorded through amplifiers 32 and 33 on tracks of a magnetic tape storage system 34 for playback with a predetermined filter response to provide at output terminals thereof signals $e_{11}(t)$ and $e_{12}(t)$ for analysis.

Figure 5:
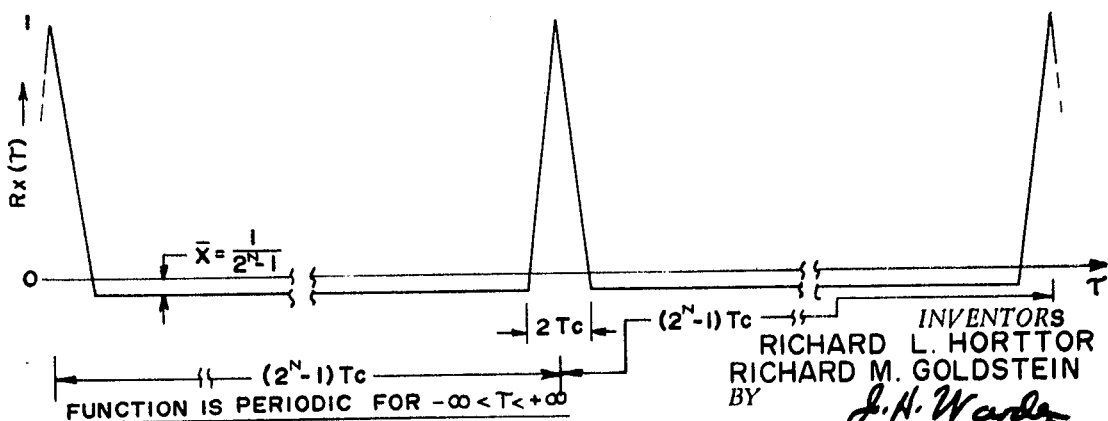
FIG. 5 illustrates a timing diagram for the autocorrelation of a ranging code $X(t)$.

The PN code which is phase modulated onto the signals $S_1(t)$ and transmitted by the transmitter 20 is generated by a commercially available code generator 35 that is synchronized by a CLOCK signal from a generator 36. In its simplest form, the code generator 35 may be an N-stage shift-register with suitable feedback paths to change its operation in such a manner as to cyclically reproduce a pattern of 1,023 "random" pulses in sequence at intervals $(2^N-1)T_C$ as shown in FIG. 5. At the end of each cycle, the code generator 35 transmits a suitable code or signal which may be denominated a WORD code signifying that one complete PN code has been generated. The WORD and CLOCK signals are recorded on separate tracks of the magnetic tape storage system 34, along with a digital TIME signal from a timer 37 for use in the analysis of the stored signals $e_9(t)$ and $e_{10}(t)$.

When the recorded signals $e_9(t)$ and $e_{10}(t)$ are read out as signals $e_{11}(t)$ and $e_{12}(t)$ for analysis, range code demodulation is carried out with the recorded WORD and CLOCK signals. That is done by correlating the signals $e_{11}(t)$ and $e_{12}(t)$ with time-shifted, locally generated versions of the PN code used for modulation as follows:

$$e_{13}(t) = e_{11}(t) X(t-T_o) \qquad (8)$$
$$e_{14}(t) = e_{12}(t) X(t-T_o) \qquad (9)$$

where $X(t-T_o)$ is the PN code generated locally by a range code generator 40 which is identical to the code generator 35 but synchronized by the recorded CLOCK signal and recycled by the recorded WORD signal via a synchronizing trigger pulse generator 41 which receives both the CLOCK and WORD signals. A variable delay element 42 couples the output of the trigger pulse generator 41 to the range code generator 40. A control 43 varies the delay until the range code from the generator 40 is correlated with the PN code modulation of the signals $e_{11}(t)$ and $e_{12}(t)$ read from the magnetic tape storage system. This autocorrelation is indicated by peaks in signals $e_{15}(t)$ and $e_{16}(t)$ at the output terminals of low-pass filters 44 and 45 connected to mixers 46 and 47 which perform the operations of equations (8) and (9).

It should be noted that although analog mixers and filters are disclosed for producing the signals $e_{15}(t)$ and $e_{16}(t)$ from the signals $e_{11}(t)$ and $e_{12}(t)$, digital multipliers may be provided for the mixers 46 and 47 and digital filters for the filters 44 and 45. In either case, the resulting signals $e_{15}(t)$ and $e_{16}(t)$ are the operating signals for analysis and mapping. It can be shown that those signals are given by the equations $$e_{15}(t) = A_5(t-\tau_a(t))\Bigg\{\cos(\phi(t)-\theta_1)$$
$$\sin\beta\int_0^\infty d\rho_2 h_2(\rho_2) R_x(T_o - \tau(t) - \rho_2)$$
$$-\bar{X}\cos\beta\sin(\phi_I(t)-\theta_1)\Bigg\} + A_{5I}\Bigg\{\cos\phi_I(t)$$
$$\sin\beta\int_0^\infty d\rho_2 h_2(\rho_2) R_x(T_o - \tau_1(t) - \rho_2)$$
$$-\bar{X}\cos\beta\sin(\phi_I(t))\Bigg\} + n_{15}(t) \qquad (10)$$

$$e_{16}(t) = A_5(t-\tau_a(t))\Bigg\{\sin(\phi(t)-\theta_1)$$
$$\sin\beta\int_0^\infty d\rho_2 h_2(\rho_2) R_x(T_o - \tau(t) - \rho_2)$$
$$+\bar{X}\cos\beta\cos(\phi(t)-\theta_1)\Bigg\} + A_{5I}\Bigg\{\bar{X}\cos\beta\cos\phi_I(t)$$
$$+\sin\phi_I(t)\sin\beta\int_0^\infty d\rho_2 h_2(\rho_2) R_x(T_o - \tau_1(t) - \rho_2)\Bigg\} + n_{16}(t)$$
$$\qquad (11)$$

The two-dimensional nature of equations (10) and (11) may be demonstrated by showing how an array of point scatterers appear. Assume the surface of the planet 15 is an array of point reflectors whose complex reflection coefficients are characterized by $\alpha_{ij}$ and $\theta_{ij}$ the amplitude and phase angle, respectively. Furthermore, each resolution strip parallel to the vehicle track is associated with a time delay $\tau^j(t)$ and a phase variation $\theta^j(t)$. Within a constant range (time delay) strip, points are separated by their time occurrence $t_i$. The time delay $\tau^j(t)$ does not vary along a strip limited by antenna beam width. Signals $e_{15}(t)$ and $e_{16}(t)$ are then expressed by a double summation over $(i,j)$ as follows:

$e_{15}(t) = \Sigma_i \Sigma_k a_{ik} A_5(t-\tau_{ak}(t-t_i)-t_i) \cdot [R_1(T_0-\tau^k(t-t_i)) \cdot \cos(\Phi^k(t-t_i) -\theta_{ik}) - R_2(T_0-\tau^k(t-t_i)) \cdot \sin(\Phi^k(t-t_i)-\theta_{ik})] +<_{51} \cdot [R_1(\tau_1-\tau_I(t))\cos(\Phi_I(t))-R_2(\tau_0-\tau_I(t))\sin(\Phi_I(t))] + n_{15}(t)$ (12)

$e_{16}(t) = \Sigma_i \Sigma_k a_{ik} A_5(5(t-t_i)-t_i) \cdot [R_1(T_0-\Sigma^k(t-t_i)) \cdot \sin(\Phi^k(t-t_i)-\theta_{ik}) + R_2(T_0-\tau^k(t-t_i)) \cdot \cos(\theta^k(t-t_i)-\theta_{ik})] + A_{51} [R_1(\tau_0-\tau_I(t))\sin(\Phi_I(t)) + R_2(\tau_0-\tau_I(t))\cos(\Phi_I(t))] + n_{16}(t)$ (13)

Several functions in these equations must be identified. The signal envelope caused by the antenna attenuation is $A_5(t)$. The propagation times are as follows:

$$\tau^j(t) = \tau_1(t-\tau_{aj}(t))+_{aj}(t) \quad (14)$$
$$\tau_{aj}(t) = \tau_{2j}(t-\tau_3(t))+_3(t) \quad (15)$$
$$\tau_I(t) = \tau_1(t-\tau_1(t))+_1(t) \quad (16)$$

where $\tau_1(t)$ is the station-to-transponder delay, $\tau_{2j}(t)$ is the transponder-to-surface delay and $\tau_3(t)$ is the surface-to-station delay. Further $\Phi_I(t)$ is the phase behavior of the direct signal $S_{5I}$, while $\Phi^j(t)$ is the overall phase behavior of a point reflector in the $j$th range slice. The amplitude and phase $(\alpha_{ij}, \theta_{ij})$ describe the reflection coefficient of the $(i,j)$ scatterer. Finally, the functions $R_1$ and $R_2$ are filtered versions of the PN code autocorrelation of function $R_x(\tau)$, which may be written as $$R_1(T_0-\tau^j(t))$$
$$= \int_0^\infty d\rho_2 \int_0^\infty d\rho_1 h_2(\rho_2) h_{IF}(\rho_1)[-\bar{x}\cos\beta\cdot\sin\theta_{IF}(\rho_1) + \sin\beta\cdot R_x(\tau_0-\tau^j(t-\rho_1-\rho_2)-\rho_1-\rho_2)\cos\theta_{IF}(\rho_1)]$$
(17)

$$R_2(T_0-\tau^j(t))$$
$$= \int_0^\infty d\rho_2 \int_0^\infty d\rho_1 h_2(\rho_2) h_{IF}(\rho_1)[+\bar{x}\co^-\beta\cdot\cos\theta_{IF}(\rho_1) + \sin\beta\cdot R_x(\tau_0-\tau^j(t-\rho_1-\rho_2)-\rho_1-_2)\sin\theta_{IF}(\rho_1)]$$
(18)

The functions $h_2(t)$ and $h_{IF}(t)$ are the impulse responses of the tape recorder and the 10 MHz. filter 27.

Because of the peaked nature of the autocorrelation $R_x(\tau)$, as shown in FIG. 5, the dominant term in equations (12) and (13) is the one for which $T_0 \approx \tau^j(t)$. For this condition, the terms may be separated into quadrature signals from the $j$th surface strip plus interference from the direct signal $S_{5I}$. From the Fig. 5 it may be seen that $R_x(\tau)$ may be expressed as $[R_x(\tau) - \bar{x}] + \bar{x}$ where $[R_x(\tau) - x]$ is nonzero only in the regions $\tau \approx 0$ and $n(2^N-1)T_C$.

It is important to make $\bar{x}$ as small as possible by making the PN code as long as conveniently possible, for a code of length $(2^N-1)$.

$$R_x(nT_C) = 1$$

where $n=0, \pm(2^N-1), \pm 2(2^N-1), ...$ $T_C$ = bit period

Thus, the autocorrelation function $R_x(\tau)$ is equal to $\bar{x}$ except when $\tau$ is equal to $nT_C$.

The map of the surface is reproduced by combining signals $e_{15}(t$ and $e_{16}(t)$ through a balanced single-sideband mixer 50 to provide $$e_{17}(t) = e_{15}(t)\cos\omega_{17}(t) - e_{16}(t)\sin\omega_{17}(t) \quad (19)$$

where $\omega_{17}$ is a reference frequency from a local oscillator 51 applied directly and through a 90° phase shifter 52 for the sine and cosine functions. The signal $e_{17}(t)$ is passed through a filter 54 matched to antenna attenuation function $A_5(t)$ and the phase behavior $\Phi^j(t)$ of a point reflector in the $j$th range slice. Depending upon the detailed nature of $\Phi^j(t)$, the scatterers for each $j$-strip are resolved. The process is repeated for each $j$ and the results are mapped (plotted or displayed) through an envelope detector 55 and display device 56, such as a cathode-ray tube display with storage, on a $(T_0,t)$ plane, where $T_0$ is a contour equal to $\tau^j(t)$. Because of the relative motion between station, spacecraft, and planet, $\tau^j(t)$ is a function of time, and a strip maps generally along a curved line rather than a straight constant range line $\tau^j(t)$. However, $T_0$ is the time reference of the PN code generator 40. Upon tracking the variable portion $\tau^j(t)$, by making $T_0 = \tau(t) + \tau$ and $\tau^j(t=\tau(t)+\tau^j$ $$T_0 - \tau^j(t) = \tau - \tau^j$$

and the output map is fixed, because the mapping coordinates would be fixed to $(\tau,t)$.

In order to repeat the process for each $j$, the local range code generator 40 is recycled at successive time intervals, once for each $j$th strip, following an initial code generation triggered through the delay element 42 in response to a WORD stored in the magnetic tape system 34. That is accomplished by a $t$-counter 60 which is reset at the time the code generator 40 is first triggered into operation. A predetermined number of clock pulses are then counted to measure the time difference between reflected signals at successively longer slant ranges. A $j$-counter 61 is reset at the same time as the $t$-counter 60, and is thereafter incremented each time the $t$-counter recycles the generation of a range code. When the desired number of strips have been mapped, an output of the $j$-counter corresponding to that number inhibits the operation of the $t$-counter by closing a gate 62. All mapping through the display device 56 is synchronized by the $j$-counter and therefore ceases until the next WORD triggers the code generator 40. The process is then repeated for the next segment of the planetary surface to be mapped, at which time the $j$-counter is reset to the first strip ($j$=0) to be mapped. Once the last strip ($j$=$n$-1) has been mapped and the $j$-counter incremented, a range code will again be reinitiated, but the mapping data of the next strip ($j$=$n$) is ignored in this arrangement.

Figure 2:
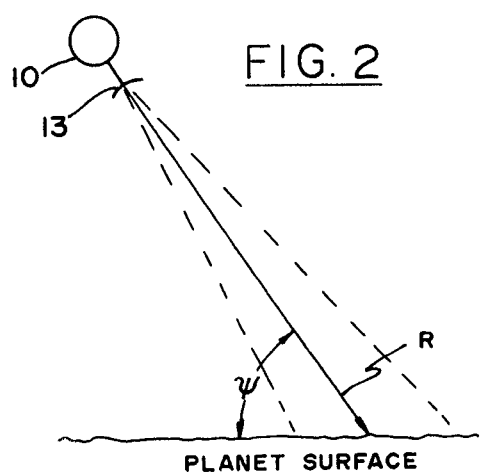
FIG. 2 illustrates in a side view the slant range and beam width of a transmitted radar signal for mapping.
Figure 3:
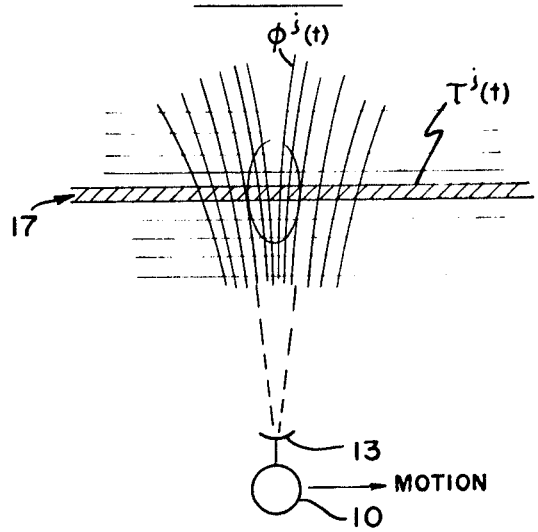
FIG. 3 illustrates in a top view the area illuminated by the transmitted beam of FIG. 2, including range and doppler contours in the area.

From the foregoing it may be appreciated that the delay 42 is adjusted to a period equal to the three delay times involved for a reflected signal received at the earthbound station 12 (FIG. 1) from the first $j$-strip to be mapped. Thereafter, the $t$-counter effectively selects strips at successively greater slant ranges (FIGS. 2 and 3). As the transponder moves in the direction parallel to the $j$-strips, the code generator 35 regenerates range codes which are recorded by the magnetic tape storage system. Then as the recorded data is read, the mapping process is repeated in the manner described for another segment of the planetary surface. That segment may be on the order of 1 square kilometer.

It should be noted that although the mapping operation described assumes direct display as the recorded data is read from the storage system 34, other arrangements may be provided such as intermediate storage of the signal $e_{17}(t)$ from the mixer 50 in digital form for later analysis. The index numbers from the $j$-counter 61 and the TIME signals would also be stored for use in the mapping operation which would proceed in a manner described. That could be readily accomplished on separate tracks of a second tape storage unit.

It should also be noted that the matched filter may be implemented using digital techniques. The mapping system would then include an analog-to-digital converter at the output of the mixer 50 and the signal $e_{17}(t)$ in digital form would be stored and later processed by a matched filter realized by a stored program in a digital computer. Programming a filter matched to the phase and envelope characteristics of a signal reflected from a point scatterer is straightforward; it simply involves the standard convolution integral. If the filter 54 is represented by $h_4(t)$, the output of the filter 54 is given by $$e_{18}(t) = \int_{-\infty}^{\infty} d\rho_4 h_4(\rho_4) e_{17}(t-\rho_4) \quad (20)$$

where $\rho_4$ is a dummy integration variable.

IF the noise in the signal $e_{17}(t)$ is broadband compared to the desired signal portion $\hat{S}_{17j}(t)$, the filter is matched when $h_4(t) = \hat{S}_{17j}(-t)$ where ^ indicates an estimate of the signal phase and envelope parameters. If the estimate is accurate, the response of the matched filter 54 is an accurate estimate of the autocorrelation of the point response signal. If $S_{17j}(t)$ is such that its autocorrelation is highly localized in time, then $S_{18j}(t)$ will be an accurate representation of a point, which is exactly what is required for mapping purposes. A signal $S_{18j}(t)$ is highly localized if it is nonzero only in a small region of $t$ about some value $t_i$. The quality of the estimate $\hat{S}_{17j}$ determines the quality of the response $S_{18j}(t)$. Thus, once an estimate is made, a matched filter is provided that will yield autocorrelation of the range gated signal from the $j$th range strip $S_{17j}(t)$ while effectively filtering out noise. The form of the matched filter is given by $$h_4(t) = \hat{A}_5(-t-\hat{t}(-t)) \cdot 2^2 \cdot \cos(-\omega_{17}t+\hat{\Phi}(-t)) \quad (21)$$

Examining the signal portion of $e_{18}(t)$ yields $$S_{18j}(t) = \int_{-\infty}^{\infty} d\rho_4 h_4(\rho_4) S_{17j}(t-\rho_4) \quad (22)$$

Substituting for $h_4$ the value given by equation 21 then yields the desired signal which, following the basic principle of conventional side looking radar, represents individual point scatterers. Thus, once range gating has been provided in accordance with the present invention, the gated signal $e_{17}(t)$ corresponds to a narrow strip at constant range from the spacecraft, and each point within that strip is resolved by the filter 54 which matches the motion-induced phase behavior that provides lines of constant doppler.

If the filter 54 is implemented in a digital computer, a digital-to-analog converter may be provided to reconvert the data to an analog form for storage on magnetic tape. The restored analog data is later played through the envelope detector 55 onto another magnetic tape. At each step of recording data, the $j$-index numbers and TIME signals are carried along, preferably in a conventional binary code form, on separate channels for ultimate use in finally assembling the data for display. The detector 55 may be conventional full-wave rectifier. The final magnetic tape is then finally read back into a computer programmed to assemble the data line by line, making sure they are in proper time synchronization for display on a cathode-ray tube. A photograph of the display will provide a permanent record. Alternatively, the computer may be programmed to plot the data on chart paper.

The different combinations of techniques that may be employed to process and display the range gated data are too numerous to list. Accordingly, the techniques suggested for implementing the matched filter 54, envelope detector 55 and display device 56 are intended to be merely by way of example only. Other techniques which may have been developed for processing conventional side-looking radar data may be employed once range gating has been achieved in accordance with the present invention, provided timing data is carried forward for use in ultimately assembling data for display. Accordingly, inasmuch as it is recognized that modifications and variations falling within the spirit of the invention will occur to those skilled in the art, it is not intended that the scope of the invention be determined by the disclosed exemplary techniques, but rather should be determined by the breadth of the appended claims.

What is claimed is:

1. In a method of mapping a planetary surface employing side-looking radar techniques, the improvement comprising:
    transmitting from an earthbound station range-coded RF signals to a transponder orbiting said planet and recording timing signals indicating the times of transmission, where said range-coded RF signals are produced by modulating an RF signal with a locally generated range code,
    retransmitting said range-coded RF signal through a directional antenna toward the surface of said planet at a predetermined incidence angle;
    receiving at said earthbound station retransmitted signals reflected from said planetary surface;
    correlating a delayed range code locally generated with a range code carried by said retransmitted signals reflected from said planetary surface; and
    separating the portion of the received signal whose modulation is thus synchronized with the delayed range code from the rest of the received signal for analysis and mapping.

2. The improvement defined in claim 1 wherein said signals reflected from said planetary surface are recorded together with said timing signals on separate tracks of a magnetic record medium for later analysis.

3. The improvement defined in claim 2 wherein correlating a locally generated and delayed range code with a range code carried by said retransmitted signals received as signals reflected from said planetary surface is accomplished by timing the local generation of a range code with said recorded times of transmission upon reading out timing signals from said record medium through a variable time delay adjusted to account for the round trip delay between the times of transmissions and the times the transmitted signals are received, whereby ranging resolution of point scatters on the planetary surface is achieved.

4. The improvement defined in claim 3 wherein said locally generated range code is recycled at successive equal increments of time, whereby code modulations of successive time delays are separated to provide mapping data of successive range strips.

5. The improvement defined in claim 4 including the step of recording the real times of transmitting range code modulations from said station in order to be able to identify time delay and doppler shift data with particular segments of a planetary surface being mapped.

6. A radar system for obtaining data through an earthbound transmitter-receiver station to map planetary surfaces comprising:
    a transponder orbiting a planet for receiving a signal from said station, and retransmitting it for reflection from the surface of said planet to said station;
    means for periodically modulating said signal being transmitted by said station to said transponder with a predetermined code; and
    means for recording time signals indicating the time of transmitting code-modulated signals and the reflected signals then being received on separate tracks of a record medium for later analysis.

7. A system as defined in claim 6 including apparatus for analyzing said recorded signals comprising:
    means for simultaneously reading out said time signals and reflected signals from said record medium;
    local generating means responsive to each timing signal read out from said record medium for locally generating said predetermined range code after a delay adjusted for a round trip delay in receiving reflected signals; and
    separating means responsive to reflected signals read out from said record medium and successive codes generated by said local generating means for separating code-modulated portions of reflected signals read out from said record medium from the rest for later analysis, each portion bearing doppler mapping data pertaining to a narrow strip at a constant slant range of said transponder to said planetary surface.

8. A system as defined in claim 7 wherein said separating means comprises:
    means for correlating the reflected signals read from said record medium with said time-shifted, locally generated codes by providing the product of code-modulated portions of said reflected signals and said locally generated codes; and
    means responsive to said correlating means for filtering out of said reflected signals all but the product of code-modulated portion s of said reflected signal and locally generated codes, whereby ranging resolution of point scatters on the planetary surface is achieved.

9. A system as defined in claim 8 including a matched filter to which each of said separated portions of reflected signals is transmitted for analysis to resolve individual point scatterers on said planetary surface and thereby provide spatial coordinates represented by doppler shift for a given constant range.

10. A system as defined in claim 9 including means for coordinating the times of said locally generated range codes with said doppler shift spatial coordinates for display.

11. In a system for obtaining planetary mapping data using a spacecraft orbiting about a planet which carries a transponder for receiving a radar signal of a given frequency from an earth bound station and retransmitting the received signal on a different frequency, said data comprising doppler contour data obtained from reflected signals received by said station from said planet at said second frequency, the improvement comprising:

means for periodically modulating said given signal transmitted by said station with a range code;

means for noting the time of each range code modulation transmitted;

and means for separating said doppler contour data from each range code modulation retransmitted by said transponder and received by said station.

12. The improvement defined in claim 11 wherein said last-named means comprises a code-generating means at said station for producing time-delayed range codes identical to said modulating range codes, means for mixing said time-delayed range codes with range code modulations received by said station, and means for filtering out all but the product of said mixing means, whereby each range code modulation is separated for doppler shift data analysis.

13. The improvement defined in claim 12 wherein said code-generating means is adjustable for various time delays, each time delay corresponding to a constant slant range between said transponder and the reflecting surface of said planet, whereby each range code modulation provides spatial coordinates represented by a time delay and doppler shifts.

14. The improvement defined in claim 13 including means for recycling said code-generating means at successive equal increments of time, whereby successive code modulations received are separated to provide mapping data of successive range strips.

\* \* \* \* \*